Oct. 16, 1934.   O. M. DUNNING   1,977,433
ELECTROMECHANICAL TRANSLATING DEVICE
Filed April 22, 1933   2 Sheets-Sheet 1
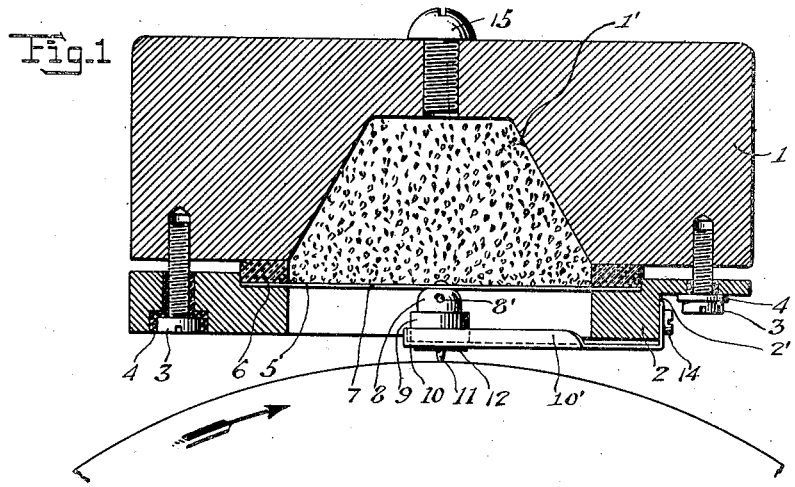
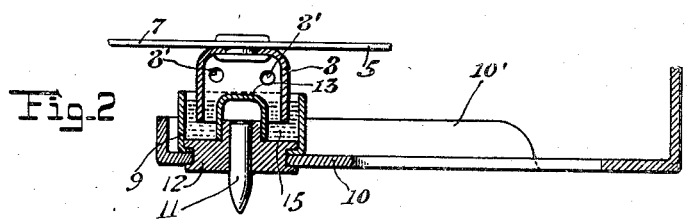
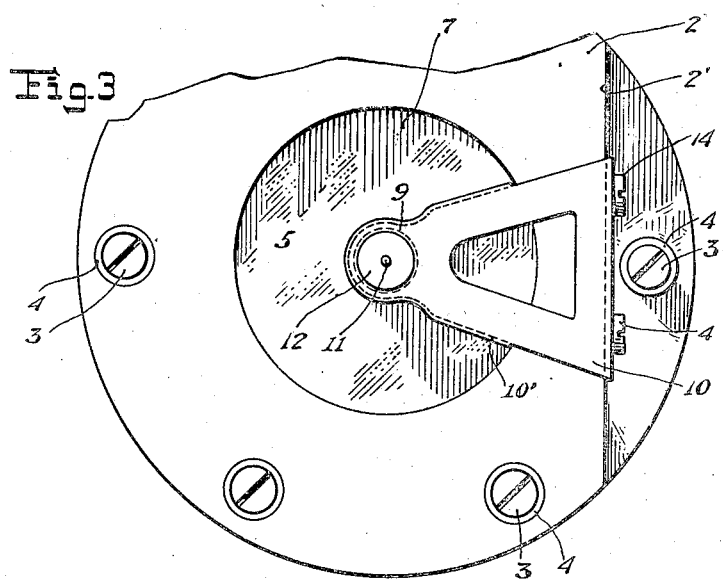
INVENTOR
ORVILLE M. DUNNING
BY
ATTORNEY

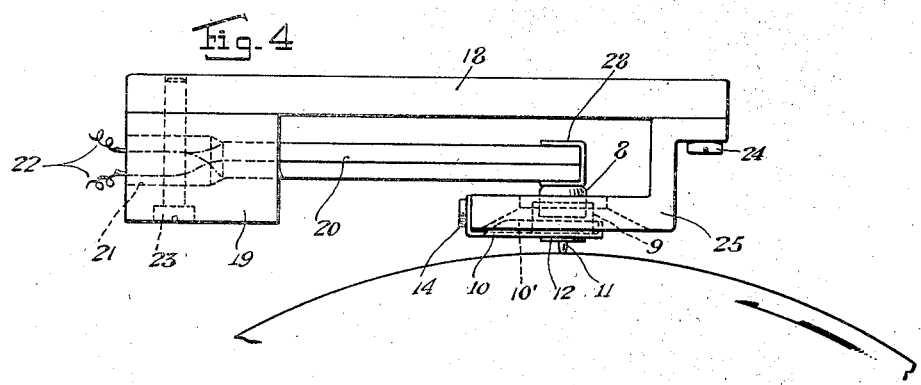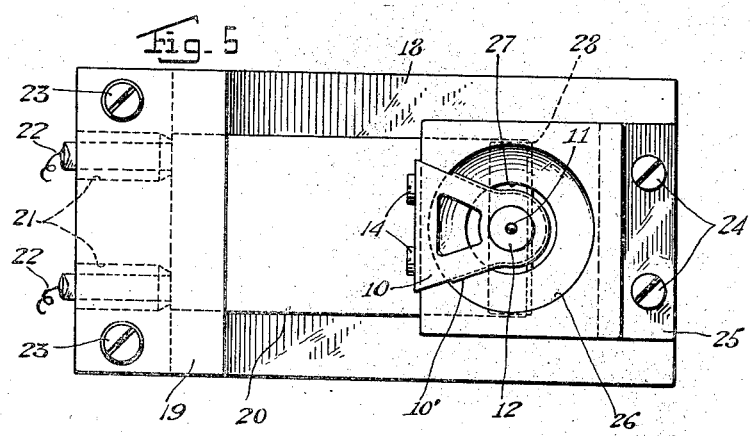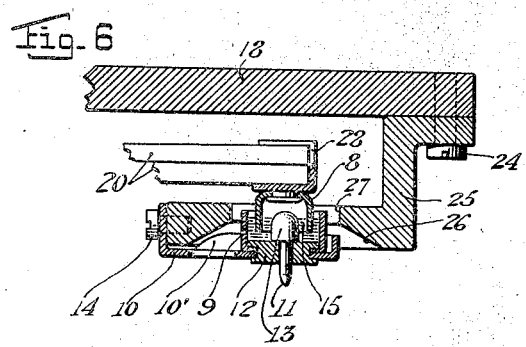

Patented Oct. 16, 1934

1,977,433

UNITED STATES PATENT OFFICE 1,977,433

ELECTROMECHANICAL TRANSLATING DEVICE

Orville M. Dunning, East Orange, N. J., assignor to Thomas A. Edison, Incorporated, West Orange, N. J., a corporation of New Jersey Application April 22, 1933, Serial No. 667,411

13 Claims. (Cl. 179—100.41)

In my copending application, Serial No. 615,306, filed June 4, 1932, I have described a new form of electro-mechanical translating device having a substantially uniform response through a wide range of frequencies combined with low mechanical impedance and high efficiency. My present invention contemplates certain modifications in the structure shown in said copending application whereby the construction and operation of such devices employing the invention may be improved, and while not limited thereto is especially applicable to phonographic reproducers.

In the above mentioned copending application, the translating device comprises, briefly, a vibration receiving member, a translating medium of the type which generates a voltage proportional to the displacement of its active element, and transmitting means consisting of a substantially pure mechanical resistance between the vibration receiving member and the translating medium. The resistance transmitting means is the principal feature of that invention since by its use it is possible to obtain all of the advantages cited above. This form of electro-mechanical translating device is particularly well suited for use as a phonographic reproducer since it provides uniform voltage output when used in conjunction with a record cut with the usual constant velocity characteristic.

In the structures described in said copending application, the viscosity transmitting means comprises a pair of opposed surfaces, movable toward and away from each other, one of the surfaces being connected to the vibration receiving member and the other to the active element of the translating medium. The two surfaces are enclosed within a casing filled or partially filled with a viscous fluid in such a way as to completely fill the space between the opposed surfaces. The extent of the opposed surfaces and the distance between them are so chosen that the mechanical impedance of the structure so formed is substantially pure resistance. However, in order to obtain good efficiency and to keep the mechanical impedance of the gap a pure resistance, it is necessary that the spacing between the opposed surfaces be made rather small, of the order of .01 inch. Under this condition small variations in the position of either of the opposed surfaces produce relatively large changes in the gap and therefore in the transmission. In a phonographic reproducer of the hill and dale type, it is necessary to bias the reproducer stylus by means of a weight or spring into engagement with the record groove. Since such biasing force is applied through the vibration receiving member, it will serve to deflect that member by an appreciable amount and to consequently change the spacing between the opposed surfaces forming the resistance transmitting means. Furthermore, it is essential that the opposed surfaces be protected against damage which might be caused if they were forced together and this is usually accomplished by making the vibration receiving member sufficiently stiff to avoid displacements as great as the normal clearance between or spacing of the surfaces under any stress likely to be encountered in the use of the reproducer. This requirement may result in excessive stiffness and undesirable high mechanical impedance in the vibration receiving member.

It is therefore an object of this invention to provide a phonographic reproducer wherein the vibration receiving member has low stiffness and wherein normal displacements of the member will not result in damage to the reproducer or in undesirably large changes in its characteristics.

It is another object of this invention to provide an electrical phonograph reproducer of improved design by reason of simultaneously decreased mass in the moving system, increased compliance and therefore lower mechanical impedance in the vibration receiving member, and increased compactness and simplicity of design.

It is a further object of this invention to provide an improved construction wherein a piezo electric crystal may be used as the translating medium of an electro-mechanical translating device.

Further objects and features of my invention will be set forth in the following specification and appended claims.

For a clearer understanding of my invention, reference may be had to the drawings accompanying and forming part of this specification, wherein:

Figure 1 is an enlarged sectional view in elevation of a phonographic reproducer embodying my invention and employing a granular carbon cell as a translating medium;

Fig. 2 is a further enlarged view, partly in section, of the stylus supporting member and its associated parts;

Fig. 3 is a view, partly broken away, of the reproducer of Fig. 1 as seen from below;

Fig. 4 is an enlarged elevational view of another embodiment of my invention employing a piezo electric crystal as a translating medium;

Fig. 5 is a plan view of the reproducer of Fig. 4 as seen from below; and

Fig. 6 is a further enlarged elevational view, partly in section, of the record engaging member of the reproducer of Fig. 4 with its associated parts.

Referring particularly to Figs. 1, 2 and 3, the reproducer comprises a base 1 which has a truncated conical opening 1'. An annulus 2 is secured to the base 1 by means of a series of clamping screws 3 threaded in the base 1 and insulated from the annulus 2 by insulating bushings 4. The annulus 2 is spaced from the base 1 by an insulating washer 6 which fits into a concentric counterbored portion of the annulus. A diaphragm 7 is also clamped in place between the washer 6 and the annulus 2. The space intervening the diaphragm 7 and the base 1 is filled nearly full of granular carbon and forms a granular carbon cell having relatively uniform resistance and operable in a horizontal position wherein the more usual type of granular carbon cell is unsatisfactory. The base 1 is provided with a central threaded hole to be used in filling the cell with carbon granules. A screw 15 is used to form a closure for the carbon cell.

An extremely light small cup 8 preferably formed of one of the light strong alloys is riveted to the diaphragm 7 approximately at the center thereof. An arm 10 is secured to a shouldered portion 2' of the annulus 2 by a pair of screws 14. The arm 10 at its outer end carries a second light small cup 9 located concentrically with the cup 8 and spaced outwardly a small distance from it. The cup 9 is held in place on the arm 10 by a rivet 12. Rivet 12 is centrally drilled to receive a stylus 11 preferably of sapphire or similar material. The rivet 12 also carries an inverted cup 13 likewise concentric with and spaced inwardly from the cup 8. The annular space between the concentric cups 9 and 13 is filled with a viscous fluid 15 which may be in the form of a grease which will not run out of the cups in case of inversion of the reproducer.

If the stylus is held in engagement with a phonographic record of the hill and dale type, the changing depth of the groove acting upon the stylus 11 will cause the arm 10 to flex in accordance with the engraving of the groove. As has been explained in the above mentioned copending application, phonographic records are ordinarily engraved with a so-called constant velocity characteristic whereby for constant loudness the amplitude of the sinusoidal velocity of a stylus driven by the record is a constant for all frequencies in the band to be transmitted. The cups 8, 9 and 13 and the intervening viscous fluid 15 form a viscosity transmitting element and if the stylus 11 and consequently the cups 9 and 13 are vibrated with a sinusoidal velocity of constant amplitude, a sinusoidal force of constant amplitude will be transmitted to the cup 8 and consequently to the diaphragm 7. The diaphragm 7 is preferably made relatively stiff and small so that its fundamental resonant frequency is above the highest frequency to be reproduced. Under these conditions the diaphragm may be considered for all practical purposes as a pure compliance and, as has been explained, when a sinusoidal force of constant amplitude is applied to a pure mechanical compliance, the amplitude of the resulting motion will be substantially constant at all frequencies.

It may be desirable to provide several small holes 8' near the top of cup 8 to allow escape of air trapped within the cup and to thus prevent a compliance reaction due to such a pocket of air.

It may also be desirable under some conditions to turn up a lip 10' around the outer edge of the stylus arm 10 in order to make the portion of the arm which is closest to the stylus very stiff against bending so that the stylus will be effectively pivoted about a point some distance away and the motion thereof will therefore be substantially rectilinear.

The construction herein shown makes it possible to eliminate a very considerable amount of mass from the moving system of the reproducer. By careful design it is possible to make the mass of the moving parts sufficiently small to reproduce frequencies up to the order of 8,000 to 10,000 cycles per second without serious loss.

This structure has a further advantage that while the clearances between the surfaces forming the viscous gaps are relatively small, the movement is confined to axial motion and it is therefore possible to maintain these small dimensions with excellent accuracy and without serious change due to the reproducer weight or other factors.

In the embodiment illustrated in Figs. 4, 5 and 6, a stylus arm and transmitting system identical with those described in connection with Figs. 1, 2 and 3 are used, and corresponding parts have been given the same numbers. However, in place of the granular carbon cell, a piezo electric crystal element 20 has been substituted as a translating medium. The piezo electric crystal element is preferably of the form shown in Patent No. 1,802,782 to C. B. Sawyer, issued April 28, 1931 and entitled Piezo electric device. The crystal element 20 is composed of two sections mounted in opposed electrostatic relation and having a common electrode at their junction and other electrodes at their outer surfaces. The two outer electrodes are connected and form one pole of the crystal element while the common electrode forms the other pole. As is described in the above mentioned patent when such a crystal element is subjected to bending stresses, a voltage is produced across the poles of the crystal. This voltage is proportional to the amplitude of the displacement of the crystal only and is therefore in this respect in the same general class of devices as the granular carbon cell described herein.

The crystal element 20 is cemented or otherwise fastened in block 19 of insulating material. Leads 22 pass out through holes drilled in the block to receive them. The block 19 is secured to one end of a base 18 by screws 23. A Z-shaped bracket 25 is also secured to the base 18 at its other end by a pair of screws 24. The bracket 25 carries the arm 10 to which the two small cups 9 and 13 are secured by the rivet 12 which carries the stylus 11. The cup 8, mounted concentrically between but spaced from the cups 9 and 13, is riveted to a U-shaped bracket 28 cemented on the outer end of the crystal element 20.

The operation in this case is similar to that described in connection with the construction illustrated in Figures 1, 2 and 3, the crystal element being held in cantilever suspension and forming a substantially pure compliance nearly up to the resonant frequency thereof due to its distributed mass and compliance. The application to the stylus of a vibration of uniform velocity characteristic will cause vibration of the crystal element 20 in a constant amplitude characteristic. This will in turn produce a voltage of substantially constant amplitude characteristic which is the desired characteristic for operation with telephonic or amplifying apparatus.

The use of this viscosity transmitting means comprising the cups 8, 9 and 13 with the intervening viscous fluid 15, in connection with piezo electric crystal elements of the type described, is distinctively advantageous. These crystal elements are normally exceedingly stiff and cannot be directly applied to a phonographic record since they would tend to destroy the engraved grooves. Even if it were possible to so construct a phonographic record that it would resist the wearing due to direct application of such a piezo electric crystal element, the frequency characteristic which would be attained would be incorrect since with a constant velocity characteristic on the record and a translating medium generating a voltage proportional to its displacement only, the response would be excessive in the lower frequencies and insufficient in the higher frequencies. The incorporation of this viscosity transmitting device therefore accomplishes the dual result of making it possible to use a piezo electric crystal element of the type described while maintaining extremely low impedance at the stylus and at the same time correcting the frequency characteristic and producing an output voltage which is proportional to the loudness of the sound as it was recorded on the record.

The design of the viscosity transmitting element may be varied widely to suit different conditions. However, it is desirable that the mass of the moving system be kept extremely low and for this reason it is usually desirable to hold the diameter of the cup 9 to .1 of an inch or less so that a very small quantity of the viscous fluid will be required and the mass of the various parts will be low. The spacing between the several cups may be varied to increase or decrease the extent of the transmitted vibration. In general it is usually essential in order to obtain a correct frequency characteristic to keep the mechanical impedance of the diaphragm 7, in the case of the embodiment illustrated in Fig. 1, and of the crystal element 20, in the embodiment of Fig. 4, as viewed from the stylus higher at all frequencies than the impedance of the viscosity transmitting element which latter impedance should be substantially pure mechanical resistance.

Having thus described my invention, I claim:

1. In an electro-mechanical translating device, means for transmitting vibrations over a range of audio frequencies comprising a plurality of substantially parallel spaced surfaces, a viscous fluid intervening said surfaces, and supporting means for at least one of said surfaces, said last named means being movable in a direction substantially parallel to said surfaces said transmitting means being a substantially pure mechanical resistance over a range of audio frequencies.

2. In an electro-mechanical translating device, means for transmitting vibrations over a range of audio frequencies comprising a plurality of substantially parallel spaced surfaces mounted for relative movement in a direction substantially parallel to said surfaces, and a viscous fluid intervening said surfaces, said surfaces and fluid forming a substantially pure mechanical resistance over a range of audio frequencies.

3. In an electro-mechanical translating device, means for transmitting vibrations over a range of audio frequencies comprising a plurality of concentric cylindrical surfaces mounted for relative movement substantially in the direction of their axis, and a viscous fluid intervening said surfaces, said transmitting means being a substantially pure mechanical resistance over a range of audio frequencies.

4. In an electro-mechanical translating device, a translating medium having a movable element and generating a voltage proportional to the displacement only of said element; and transmitting means connected to said element and comprising a plurality of substantially parallel spaced surfaces mounted for relative movement in a direction substantially parallel to said surfaces, and a viscous fluid intervening said surfaces, said fluid and surfaces coacting to form a substantially pure mechanical resistance of lower value than the mechanical impedance of said movable element over a range of audio frequencies.

5. In an electro-mechanical translating device, a translating medium having a movable element and generating a voltage proportional to the displacement of said element; and transmitting means connected to said element and comprising a plurality of spaced concentric cylindrical surfaces mounted for relative movement substantially in the direction of their axis, and a viscous fluid intervening said surfaces, said fluid and surfaces coacting to form a substantially pure mechanical resistance of lower value than the mechanical impedance of said movable element over a range of frequencies.

6. In a vibration translating device, a vibration receiving structure, a translating medium having a movable element, and transmitting means between said structure and said element comprising a plurality of relatively movable substantially parallel spaced surfaces and intervening viscous fluid, said fluid and surfaces forming a mechanical impedance consisting chiefly of mechanical resistance at audio frequencies, said means being connected to said structure and said element to restrict relative motion of said surfaces to a direction substantially parallel to said surfaces.

7. A phonographic reproducer comprising a vibratable member actuatable by a record, a translating medium having a movable element, and transmitting means between said member and said element comprising a surface connected to said element, another surface spaced from and substantially parallel to said first named surface and connected to said vibratable member for motion in a direction substantially parallel to said first named surface, and a viscous fluid intervening said surfaces, said surfaces and fluid forming a substantially pure mechanical resistance over a range of audio frequencies.

8. A phonographic reproducer comprising a vibratable member actuatable by a record, a granular carbon cell having a movable element and generating a voltage proportional to the displacement of said element, and transmitting means between said member and element comprising a plurality of substantially parallel spaced surfaces mounted for relative movement in a direction substantially parallel to said surfaces and a viscous fluid intervening said surfaces, said surfaces and fluid forming a substantially pure mechanical resistance over a range of audio frequencies.

9. A phonographic reproducer comprising a vibratable member actuatable by a record, a granular carbon cell having a movable element and generating a voltage proportional to the displacement of said element, and transmitting means between said member and element comprising a plurality of substantially parallel spaced concentric cylindrical surfaces mounted for relative movement substantially in the direction of their axes and a viscous fluid intervening said surfaces, said surfaces and fluid forming a substantially pure mechanical resistance over a range of audio frequencies.

10. In an electro-mechanical translating device, a vibration receiving structure, a translating medium having a movable element, and transmitting means between said structure and element comprising a cup-like member, a second member having a surface extending within said cup-like member and substantially parallel to but spaced from the inner surface thereof, and a viscous fluid within said cup-like member, said transmitting means forming a substantially pure mechanical resistance of lower value than the mechanical impedance of said movable element over a range of audio frequencies.

11. In an electro-mechanical translating device, a frame, a vibration receiving structure mounted on said frame, a translating medium comprising an element made up of a plurality of portions of piezo-electric material mounted in opposed electrostatic relation to each other, said element being secured to said frame with a part free to bend under applied stress, and transmitting means between said structure and element having an impedance which is a substantially pure mechanical resistance.

12. In an electro-mechanical translating device, a frame, a vibration receiving structure mounted on said frame, a translating medium comprising an element made up of a plurality of portions of piezo-electric material mounted in opposed electrostatic relation to each other, said element being secured to said frame with a part free to bend under applied stress, and transmitting means between said structure and element comprising a pair of relatively movable spaced surfaces and a fluid intervening said surfaces, whereby motion of said structure causes a force to be applied to said element proportional to the velocity only of said motion.

13. In an electro-mechanical translating device, a frame, a vibration receiving structure mounted on said frame, a translating medium comprising an element made up of a plurality of portions of piezo-electric material mounted in opposed electrostatic relation to each other, said element being secured to said frame with a part free to bend under applied stress; and transmitting means between said structure and element comprising a plurality of substantially parallel spaced surfaces mounted for movement in a direction substantially parallel to said surfaces, and a viscous fluid intervening said surfaces.

ORVILLE M. DUNNING.